United States Patent
Tripathy et al.

(10) Patent No.: US 10,339,124 B2
(45) Date of Patent: Jul. 2, 2019

(54) DATA FINGERPRINT STRENGTHENING

(71) Applicant: QUEST SOFTWARE INC., Aliso Viejo, CA (US)

(72) Inventors: Tarun K. Tripathy, Newark, CA (US); Murali Bashyam, Fremont, CA (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 487 days.

(21) Appl. No.: 14/722,914

(22) Filed: May 27, 2015

(65) Prior Publication Data
US 2016/0350301 A1    Dec. 1, 2016

(51) Int. Cl.
| | | |
|---|---|---|
| *G06F 17/30* | (2006.01) | |
| *G06F 16/22* | (2019.01) | |
| *G06F 16/174* | (2019.01) | |
| *G06F 17/27* | (2006.01) | |
| *G06F 16/13* | (2019.01) | |
| *G06F 11/14* | (2006.01) | |

(52) U.S. Cl.
CPC ...... *G06F 16/2255* (2019.01); *G06F 16/1752* (2019.01); *G06F 17/2705* (2013.01); *G06F 11/1453* (2013.01); *G06F 16/137* (2019.01); *G06F 16/1744* (2019.01); *G06F 16/1748* (2019.01); *G06F 16/1756* (2019.01)

(58) Field of Classification Search
CPC ............ G06F 11/1453; G06F 11/1451; G06F 17/30153; G06F 17/2705; G06F 17/30115; G06F 17/3015; G06F 17/30159; G06F 17/30174; G06F 17/3033; G06F 16/1752; G06F 21/6218; G06F 16/174; G06F 16/1744; G06F 16/1748; G06F 16/137; G06F 16/16; G06F 16/1756; G06F 16/2255; G06F 16/2365
USPC ....... 707/698, 692, 690, 673, 737, 747, 664, 707/667
See application file for complete search history.

(56) References Cited

U.S. PATENT DOCUMENTS

| | | | | |
|---|---|---|---|---|
| 7,734,598 | B2 * | 6/2010 | Noguchi ......... | G11B 20/00086 707/690 |
| 8,112,496 | B2 * | 2/2012 | Manasse ............ | G06F 17/3015 706/13 |
| 8,174,412 | B2 * | 5/2012 | Reddy ............... | G06F 17/30153 341/51 |
| 8,515,909 | B2 * | 8/2013 | Anglin ............. | G06F 17/30371 707/637 |
| 8,533,483 | B2 * | 9/2013 | Izu ......................... | G06F 21/64 713/180 |
| 8,732,411 | B1 * | 5/2014 | Chatterjee ............ | G06F 3/0641 711/147 |
| 8,977,602 | B2 * | 3/2015 | Shoens ............. | G06F 17/30115 707/698 |
| 9,081,771 | B1 * | 7/2015 | Faibish ................... | G06F 17/30 |

(Continued)

*Primary Examiner* — Dangelino N Gortayo
(74) *Attorney, Agent, or Firm* — Maschoff Brennan

(57) ABSTRACT

Techniques and mechanisms described herein facilitate the strengthening of a data fingerprint. According to various embodiments, a data stream may be parsed into a plurality of data chunks. A hash function may be applied to each of the data chunks to determine a respective data chunk hash value. A respective data chunk fingerprint for each of the plurality of data chunks may be transmitted to a remote server. Each data chunk fingerprint may include the respective data chunk hash value and one or more respective intermediate hash values.

18 Claims, 8 Drawing Sheets

(56) References Cited

U.S. PATENT DOCUMENTS

| | | | |
|---|---|---|---|
| 9,306,752 B2* | 4/2016 | Owlett | H04L 9/3236 |
| 9,898,478 B2* | 2/2018 | Vijayan | G06F 17/30312 |
| 2003/0212893 A1* | 11/2003 | Hind | H04L 9/3236 |
| | | | 713/177 |
| 2008/0005141 A1* | 1/2008 | Zheng | G06F 3/0608 |
| 2009/0313483 A1* | 12/2009 | Ranade | G06F 11/1453 |
| | | | 713/193 |
| 2015/0010143 A1* | 1/2015 | Yang | G09C 1/00 |
| | | | 380/28 |
| 2015/0088839 A1* | 3/2015 | Jones | G06F 3/0608 |
| | | | 707/692 |
| 2016/0092701 A1* | 3/2016 | Shah | G06F 21/64 |
| | | | 713/189 |

* cited by examiner

DATA FINGERPRINT STRENGTHENING

TECHNICAL FIELD

The present disclosure relates generally to data storage, and more specifically to the operation of client devices in communication with network-accessible or network-attached storage systems.

DESCRIPTION OF RELATED ART

Data is often stored in storage systems that are accessed via a network. Network-accessible storage systems allow potentially many different client devices to share the same set of storage resources. A network-accessible storage system can perform various operations that render storage more convenient, efficient, and secure. For instance, a network-accessible storage system can receive and retain potentially many versions of backup data for files stored at a client device. As well, a network-accessible storage system can serve as a shared file repository for making a file or files available to more than one client device.

Some data storage systems may perform operations related to data deduplication. In computing, data deduplication is a specialized data compression technique for eliminating duplicate copies of repeating data. Deduplication techniques may be used to improve storage utilization or network data transfers by effectively reducing the number of bytes that must be sent or stored. In the deduplication process, unique chunks of data, or byte patterns, are identified and stored during a process of analysis. As the analysis continues, other chunks are compared to the stored copy and a redundant chunk may be replaced with a small reference that points to the stored chunk. Given that the same byte pattern may occur dozens, hundreds, or even thousands of times, the amount of data that must be stored or transferred can be greatly reduced. The match frequency may depend at least in part on the chunk size. Different storage systems may employ different chunk sizes or may support variable chunk sizes.

Deduplication differs from standard file compression techniques. While standard file compression techniques typically identify short repeated substrings inside individual files, storage-based data deduplication involves inspecting potentially large volumes of data and identify potentially large sections—such as entire files or large sections of files—that are identical, in order to store only one copy of a duplicate section. In some instances, this copy may be additionally compressed by single-file compression techniques. For example, a typical email system might contain many instances of the same one megabyte (MB) file attachment. In conventional backup systems, each time the system is backed up, all 100 instances of the attachment are saved, requiring 100 MB storage space. With data deduplication, the storage space required may be limited to only one instance of the attachment. Subsequent instances may be referenced back to the saved copy for deduplication ratio of roughly 100 to 1.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide techniques mechanisms for strengthening a data fingerprint. According to various embodiments, a data stream may be parsed into a plurality of data chunks. A respective data chunk hash value for each of the plurality of data chunks may be determined by applying a hash function to each of the plurality of data chunks. A respective data chunk fingerprint for each of the plurality of data chunks may be sent to a remote server. Each data chunk fingerprint may include the respective data chunk hash value and one or more respective intermediate hash values.

According to various embodiments, the one or more respective intermediate hash values may be generated during the parsing of the data stream or during the determining of the data chunk hash values. A respective data chunk checksum value may be generated during the parsing of the data stream. The one or more respective intermediate hash values may include the respective data chunk checksum value.

In some implementations, the hash function may be an additive hash function which yields the data chunk hash value by summing a plurality of results produced by applying a mathematical function to a respective data chunk and a plurality of intermediate results. The one or more respective intermediate hash values may include one or more of the intermediate results.

According to various embodiments, the respective data chunk fingerprint may be determined by concatenating the respective data chunk hash value and the one or more respective intermediate hash values. Alternately, or additionally, the respective data chunk fingerprint may be determined by applying a mathematical function to the respective data chunk hash value and the one or more respective intermediate hash values.

In some embodiments, the communications interface may receive a data chunk status message indicating whether a data chunk associated with one of the data chunk fingerprints is stored at the remote server. The communications interface may transmit the data chunk to the remote server for storage when it is determined that the data chunk is not stored at the remote server.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
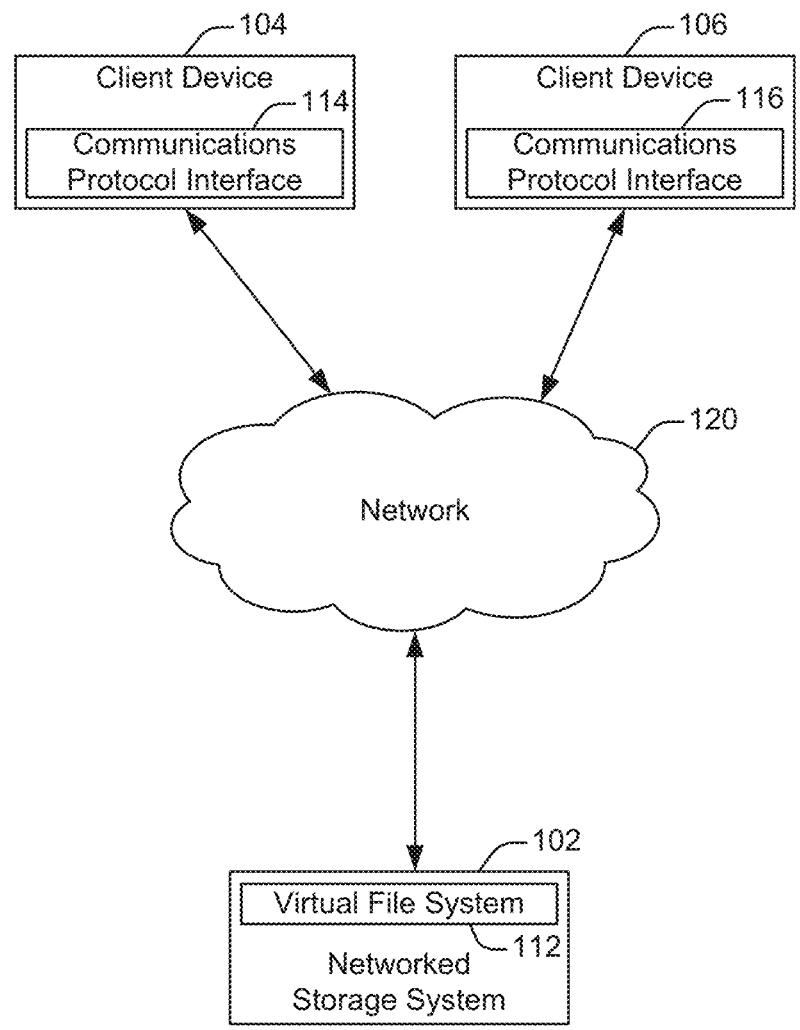
FIG. 1 shows an example of a network storage network storage arrangement, arranged in accordance with one or more embodiments.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular data storage mechanisms. However, it should be noted that the techniques and mechanisms of the present invention apply to a variety of different data storage mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein may facilitate fast fingerprinting of data chunks. To construct a fingerprint of a chunk, a fast hashing algorithm such as MD5 or SHA1 may be used to compute an initial hash value of the chunk. Then, the initial hash value may be combined with one or more intermediate values used to parse the chunk and/or compute the initial hash value. The resulting combination may be designated as the chunk fingerprint. For example, an intermediate value produced during the computation of the hash value may be combined with the initial hash value to produce the fingerprint. As another example, a checksum value produced during the construction of the chunk may be combined with the initial hash value to produce the fingerprint. In some implementations, these and other techniques described herein may allow the construction of stronger fingerprints with fewer collisions. At the same time, computing resources may be conserved since the additional fingerprint strength can derive from intermediate values already available rather than new values that must be computed specifically to improve the fingerprint strength.

Example Embodiments

According to various embodiments, data at a client device may be transmitted to a networked storage system for storage. At least some of the data may be stored on the networked storage system in a deduplicated state.

In some implementations, data may be deduplicated by first dividing a data stream into chunks using a parser and then computing a fingerprint for each chunk using a fingerprinting algorithm. In some embodiments, a fingerprinting algorithm is a procedure that maps an arbitrarily sized data item (such as a chunk of data) to a much shorter bit string, its fingerprint. This fingerprint may be used to identify the original data, just as human fingerprints uniquely identify people. This fingerprint may be used for data de-duplication purposes. For instance, the fingerprint may be used to quickly determine whether a data chunk is already stored on a storage system.

In some instances, data may be deduplicated at the networked storage system. For instance, the networked storage system may review data to determine whether it matches other data stored on the storage system. When a duplicate is found, the networked storage system may eliminate duplicate data chunks and update a reference count to track the number of copies of the duplicated data.

According to various embodiments, data may be deduplicated at the client device. For instance, a data stream designated for storage on the networked storage system may be parsed at the client device using the same parser that exists on the networked storage device. The parser may break the data stream into one or more data chunks, which may be fingerprinted using the same fingerprinter that is used at the networked storage system. The client device may then consult with the networked storage system to determine whether a chunk is already stored at the networked storage system before transmitting the chunk over the network. For instance, the client device may communicate with the networked storage system via custom communications protocol semantics associated with a custom communications protocol.

According to various embodiments, a relatively strong fingerprinting algorithm is one that produces fingerprints with relatively few collisions. A collision is a situation in which the fingerprinting algorithm produces identical fingerprints for two different chunks.

When computing fingerprints for chunks, a tension exists between the speed of the hashing procedure used to produce the fingerprints and the strength of the resulting fingerprints. For example, a relatively fast hashing algorithm such as MD5 or SHA1 conserves computing resources but yields hash values with a relatively higher collision rate. In contrast, a relatively slow hashing algorithm such as SHA-256 or SHA-512 requires more computing resources but yields hash values with a relatively lower collision rate.

In some implementations, techniques and mechanisms described herein may be used to produce fingerprints with relatively lower collision rates while still executing quickly and conserving scarce compute resources. For instance, intermediate values used to compute chunk boundaries and/or fingerprints may be used to strengthen the fingerprints that result from a relatively fast hashing algorithm such as MD5 or SHA1. By using these pre-computed values to strengthen a relatively fast hashing algorithm, a very strong fingerprinting mechanism may be constructed without sacrificing speed of computation.

In some embodiments, a fingerprinting algorithm relies on a rolling checksum or other pre-computed value produced a process prior to fingerprinting. For instance, a data stream may be parsed into chunks using a parser such as Rabin. During the parsing of the data stream, candidate chunks are identified. In the case of Rabin, a checksum of a subset area of the candidate chunk has been produced in the process already. This checksum may then be used during the fingerprinting process to providing a stronger fingerprint without needing to compute an additional value specifically to improve fingerprint strength. For instance, the rolling checksum may be concatenated with a value produced by applying a fast hashing algorithm to the chunk.

In some embodiments, a hash function may produce one or more intermediate values before the computation of the hash value. For instance, a hash value may be computed on a rolling basis by combining intermediate hash values for successive portions of the chunk with previously computed intermediate hash values for earlier portions of the chunk. In this case, the fingerprinting procedure may designate one or more of these intermediate values, such as the intermediate value reached for offset n/2 in a chunk of size n, to use in strengthening the resulting fingerprint. This intermediate value may then be used during the fingerprinting process to providing a stronger fingerprint without needing to compute an additional value specifically to improve fingerprint strength. For instance, the intermediate value may be concatenated with the final result of the fast hashing algorithm.

According to various embodiments, techniques and mechanisms are described herein with respect to deduplication applications. However, the techniques and mechanisms described are applicable to a wide variety of contexts. For instance, the techniques and mechanisms described herein are applicable to any area in which it is desired to produce stronger fingerprints or hash values while not appreciably increasing the usage of computing resources.

FIG. 1 shows an example of a network storage arrangement, arranged in accordance with one or more embodiments. The network storage arrangement shown in FIG. 1 includes a networked storage system 102 in communication with client devices 104 and 106 via a network 120. The client devices are configured to communication with the networked storage system 102 via the communications protocol interfaces 114 and 116. The networked storage system 102 is configured to process file-related requests from the client devices via the virtual file system 102.

According to various embodiments, the client devices and networked storage system shown in FIG. 1 may communicate via a network 120. The network 120 may include any nodes or links for facilitating communication between the end points. For instance, the network 120 may include one or more WANs, LANs, MANs, WLANs, or any other type of communication linkage.

In some implementations, the networked storage system 102 may be any network-accessible device or combination of devices configured to store information received via a communications link. For instance, the networked storage system 102 may include one or more DR4000 or DR6000 storage appliances provided by Dell Computer of Round Rock, Tex.

In some embodiments, the networked storage system 102 may be operable to provide one or more storage-related services in addition to simple file storage. For instance, the networked storage system 102 may be configured to provide deduplication services for data stored on the storage system. Alternately, or additionally, the networked storage system 102 may be configured to provide backup-specific storage services for storing backup data received via a communication link.

According to various embodiments, each of the client devices 104 and 106 may be any computing device configured to communicate with the networked storage system 102 via a network or other communications link. For instance, a client device may be a desktop computer, a laptop computer, another networked storage system, a mobile computing device, or any other type of computing device. Although FIG. 1 shows two client devices, other network storage arrangements may include any number of client devices. For instance, corporate networks often include many client devices in communication with the same networked storage system.

According to various embodiments, the client devices may communicate with the networked storage system 102 via the communications protocol interfaces 114 and 116. Different client devices may employ the same communications protocol interface or may employ different communications protocol interfaces. The communications protocol interfaces 114 and 116 shown in FIG. 1 may function as channel protocols that include a file-level system of rules for data exchange between computers. For example, a communications protocol may support file-related operations such as creating a file, opening a file, reading from a file, writing to a file, committing changes made to a file, listing a directory, creating a directory, etc. Types of communication protocol interfaces that may be supported may include, but are not limited to: Network File System (NFS), Common Internet File System (CIFS), Server Message Block (SMB), Open Storage (OST), Web Distributed Authoring and Versioning (WebDAV), File Transfer Protocol (FTP), Trivial File Transfer Protocol (TFTP).

In some implementations, a client device may communicate with a networked storage system using the NFS protocol. NFS is a distributed file system protocol that allows a client computer to access files over a network in a fashion similar to accessing files stored locally on the client computer. NFS is an open standard, allowing anyone to implement the protocol. NFS is considered to be a stateless protocol. A stateless protocol may be better able to withstand a server failure in a remote storage location such as the networked storage system 102. NFS also supports a two-phased commit approach to data storage. In a two-phased commit approach, data is written non-persistently to a storage location and then committed after a relatively large amount of data is buffered, which may provide improved efficiency relative to some other data storage techniques.

In some implementations, a client device may communicate with a networked storage system using the CIFS protocol. CIFS operates as an application-layer network protocol. CIFS is provided by Microsoft of Redmond Wash. and is a stateful protocol.

In some embodiments, a client device may communicate with a networked storage system using the OST protocol provided by NetBackup.

In some embodiments, different client devices on the same network may communicate via different communication protocol interfaces. For instance, one client device may run a Linux-based operating system and communicate with a networked storage system via NFS. On the same network, a different client device may run a Windows-based operating system and communicate with the same networked storage system via CIFS. Then, still another client device on the network may employ a NetBackup backup storage solution and use the OST protocol to communicate with the networked storage system 102.

According to various embodiments, the virtual file system layer (VFS) 102 is configured to provide an interface for client devices using potentially different communications protocol interfaces to interact with protocol-mandated operations of the networked storage system 102. For instance, the virtual file system 102 may be configured to send and receive communications via NFS, CIFS, OST or any other appropriate protocol associated with a client device.

In some implementations, the network storage arrangement shown in FIG. 1 may be operable to support a variety of storage-related operations. For example, the client device 104 may use the communications protocol interface 114 to create a file on the networked storage system 112, to store data to the file, to commit the changes to memory, and to close the file. As another example, the client device 106 may use the communications protocol interface 116 to open a file on the networked storage system 102, to read data from the file, and to close the file.

In particular embodiments, a communications protocol interface 114 may be configured to perform various techniques and operations described herein. For instance, a customized implementation of an NFS, CIFS, or OST communications protocol interface may allow more sophisticated interactions between a client device and a networked storage system.

According to various embodiments, a customized communications protocol interface may appear to be a standard communications protocol interface from the perspective of the client device. For instance, a customized communications protocol interface for NFS, CIFS, or OST may be configured to receive instructions and provide information to other modules at the client device via standard NFS, CIFS, or OST formats. However, the customized communications protocol interface may be operable to perform non-standard operations such as a client-side data deduplication.

Figure 2:
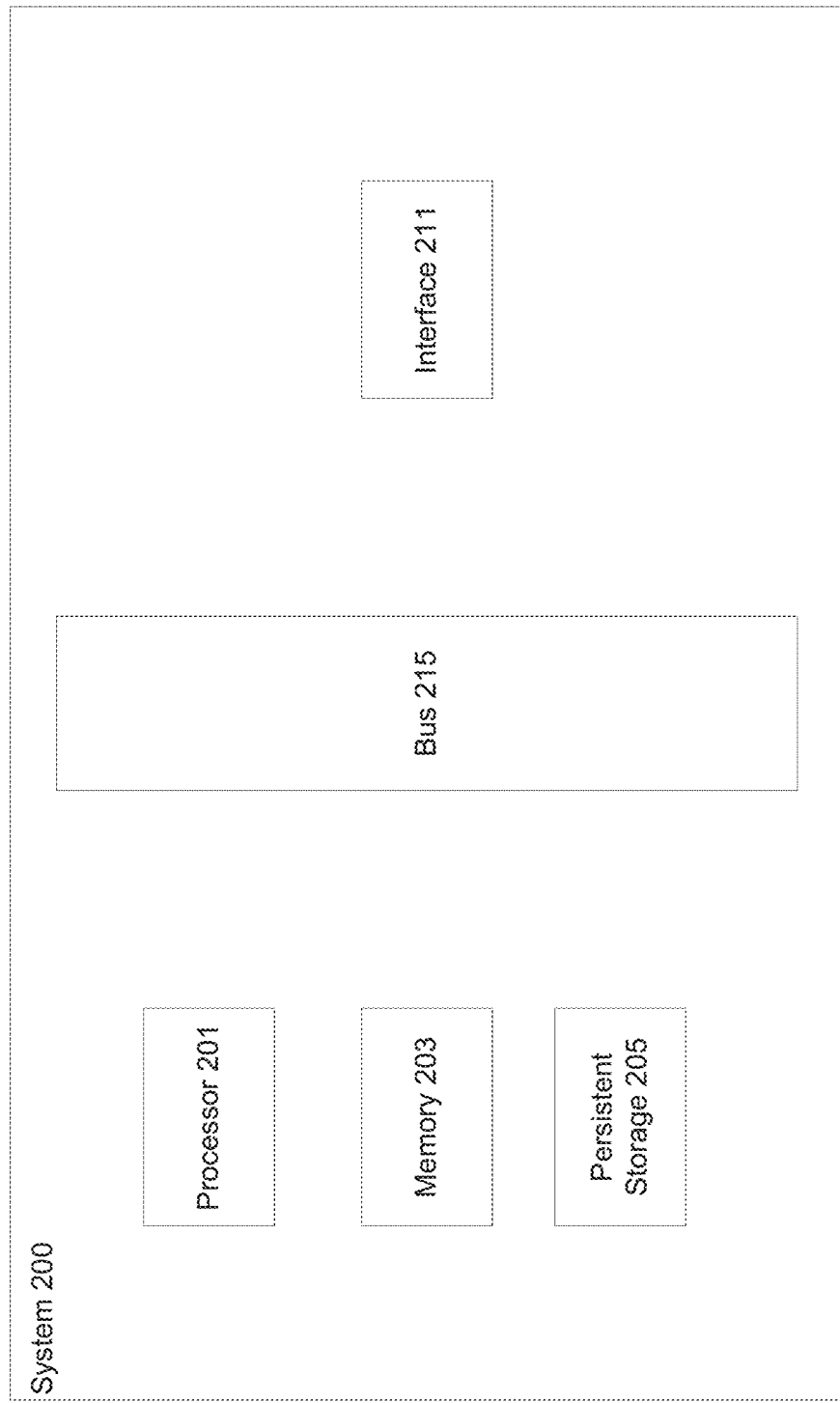
FIG. 2 illustrates a particular example of a system that can be used in conjunction with the techniques and mechanisms of the present invention.

FIG. 2 illustrates a particular example of a system that can be used in conjunction with the techniques and mechanisms of the present invention. According to particular example embodiments, a system 200 suitable for implementing particular embodiments of the present invention includes a processor 201, a memory 203, an interface 211, persistent storage 205, and a bus 215 (e.g., a PCI bus). For example, the system 200 may act as a client device such as the client device 104 or the client device 106 shown in FIG. 1. When acting under the control of appropriate software or firmware, the processor 201 is responsible for such tasks such as generating instructions to store or retrieve data on a remote storage system. Various specially configured devices can also be used in place of a processor 201 or in addition to processor 201. The complete implementation can also be done in custom hardware. The interface 211 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 205 may include disks, disk arrays, tape devices, solid-state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 200 uses memory 203 to store data and program instructions for operations such as fingerprint generation. The program instructions may control the operation of an operating system and/or one or more applications, for example. The memory or memories may also be configured to store received metadata and batch requested metadata.

Figure 3:
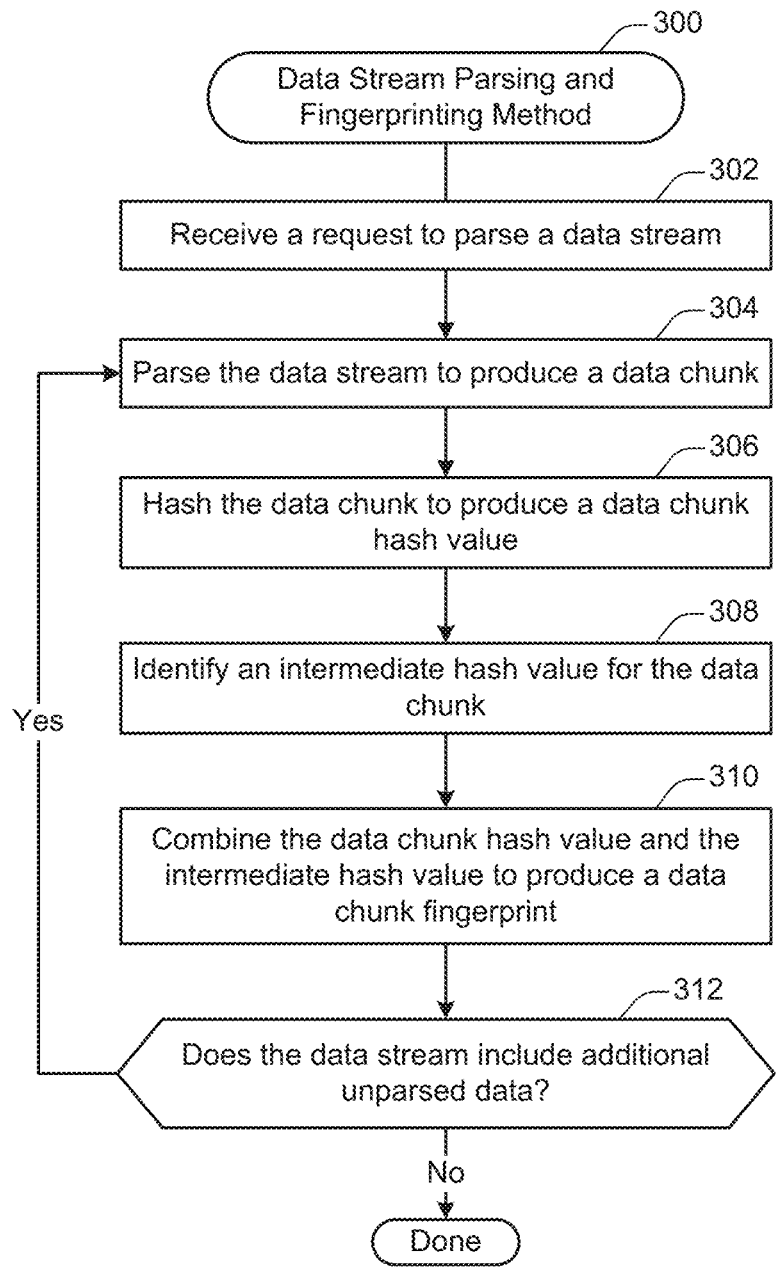
FIG. 3 illustrates an example of method of parsing and fingerprinting a data stream, performed in accordance with one or more embodiments.

FIG. 3 illustrates an example of a method 300 of parsing and fingerprinting a data stream, performed in accordance with one or more embodiments. According to various embodiments, the method 300 may be performed at a client machine in communication with a networked storage system. For instance, the method 300 may be performed as part of an operation to transfer the data stream to the networked storage system for storage.

In particular embodiments, the parsing and fingerprinting of the data stream may be performed in such a way that the procedure is replicable on other client machines and servers. For instance, if a different client machine or the networked storage system were provided with the same data stream, the different client machine and the networked storage system could produce the same chunks and fingerprints as the client machine on which the method 300 is performed.

In some embodiments, the method 300 may be used to facilitate the storage of data in a deduplicated state. For instance, a data stream may first be parsed into chunks, and then a fingerprint may be determined for each chunk. The chunk fingerprint may be compared with other fingerprints associated with data already stored on a networked storage system. If the chunk fingerprint is not present on the storage system, then the chunk may be transmitted to the storage system for storage. If instead the chunk fingerprint is already present on the server, then the system may conclude that the data chunk is already stored. In this case, the storage system may need to only update a reference count for the duplicate data chunk rather than store an additional copy of the data chunk.

In some implementations, the method 300 may be performed in conjunction with other procedures discussed herein. For example, the method 300 may be performed as part of the parsing and fingerprinting discussed with respect to operations 706 and 708 shown in FIG. 7.

At 302, a request is received to parse a data stream. According to various embodiments, the request may be received at a communications protocol interface at a client machine, such as the communications protocol interface 114 shown in FIG. 1. The request may be received as part of an operation in which all or portions of the data stream are transmitted to the networked storage system for storage. For instance, a backup procedure implemented at the client machine may transmit a request to store a data stream on the networked storage system.

According to various embodiments, the data stream may be any type, size, or configuration of data capable of being parsed and fingerprinted. For instance, the data stream may include a file, a group of files, a binary large object (BLOB), or any other type of data.

At 304, the data stream is parsed to produce a data chunk. Various techniques exist for parsing a data stream into chunks. In particular embodiments, the parser may employ a rolling checksum technique such as Rabin-Karp. The parser may parse a data stream in increments such as 8 bytes. The checksum may be computed in a rolling fashion. When the rolling checksum is generated, a computed checksum value may be compared with one or more criteria to determine whether the computed checksum value qualifies as a chunk boundary. For instance, one criterion may indicate that a chunk boundary has been reached when the computed checksum value is a prime number. The parser may also enforce a minimum and/or maximum chunk size. For example, chunks may be limited in size to between 16 and 48 kilobytes. Alternately, different chunk size restrictions may be used for different types of data presented. In this way, similar data streams may be parsed into similar chunks.

According to various embodiments, the parser may be configured in such a way that two data streams identical except for offset will be reliably parsed into the same chunks. Also, two similar and well-ordered data streams may be reliably parsed in a similar fashion. In this way, data streams may be parsed into chunks in a manner likely to frequently generate duplicate chunks when similar data is provided to the parser.

At 306, the data chunk is hashed to produce a data chunk hash value. According to various embodiments, hashing the data chunk may involve applying a hashing algorithm to the data chunk. Any of various hashing algorithms may be employed. Suitable hashing algorithms include, but are not limited to, SHA-1 and MD5. In some implementations, an additive hash procedure may be used. An additive function is one that involves successively applying iteratively applying a mathematical procedure to portions of an initial value and computing a rolling sum of the intermediate values produced. An example of a technique for hashing a chunk is discussed with respect to the method 600 shown in FIG. 6.

At 308, an intermediate hash value is identified. According to various embodiments, the intermediate hash value may be any value derived from the procedure for determining and/or hashing the chunk. By employing such an intermediate hash value, the fingerprint produced for the data chunk may be strengthened without incurring the additional computing cost that would be involved if an additional hash value were to be computed separately. Any of various techniques may be used to produce an intermediate hash value.

According to various embodiments, the intermediate hash value may be reliably reproduced in different contexts to ensure that different systems would produce the same encryption key if given the same input. For instance, the intermediate hash value may be produced during the computation of the final hash value using an additive hash function. The additive hash function may be guaranteed to produce the same intermediate hash value at a particular offset of a chunk irrespective of the platform it is running on or other conditions that may vary between machines and over time.

For example, the parsing of the data stream into chunks discussed at operation 304 may produce a checksum value for each chunk. The checksum value, which may be an attribute or output of the parser being used (e.g., Rabin), can be identified for use as an intermediate hash value. Checksum values are discussed in additional detail with respect to FIG. 5. The intermediate hash value can be concatenated with or added mathematically to the hash value of the chunk. For example, this intermediate hash value could be 4 bytes or some other number of bytes. The hash value of the chunk could be 16 bytes or some other number of bytes. Strengthening may be performed by concatenation or some other method of combination. For instance, in this case the 16 byte hash value may be concatenated with the 4 byte intermediate value to produce a 20 byte fingerprint for the chunk.

As another example, data chunk may be hashed at operation 306 using an additive hash function. An additive hash function may reliably produce the same value at the same offset when provided with the same input data. Accordingly, the intermediate hash value may be identified by first designating an offset value and then storing an intermediate value produced during the additive hash function when the designated offset value is reached. For instance, if the data chunk is of length n bytes, then the offset may be specified as $n/2$, $n/3$, $2n/3$, or some other such value. Techniques for identifying an intermediate hash value from an additive hash function are discussed in additional detail with respect to FIG. 6.

In particular embodiments, more than one intermediate hash value may be used. For example, one intermediate hash value may be drawn from the procedure for hashing the data chunk, while a chunk checksum produced by the parser may be used as another intermediate hash value. As another example, different intermediate hash values may be drawn from different offsets of an additive hash function.

At 310, the data chunk hash value and the intermediate hash value are combined to produce a data chunk fingerprint. According to various embodiments, the data chunk hash value and the intermediate hash value may be combined in any of various ways to produce the data chunk fingerprint. For instance, the data chunk hash value and the intermediate hash value may be concatenated, with either value being placed first.

In particular embodiments, different client machines and/or servers may implement the same procedure for producing data chunk hash values, producing intermediate hash values, and combining the two values to produce a fingerprint. In this way, different client machines and/or servers may produce the same chunks and fingerprints when presented with the same data stream, thus allowing for the data stream to be stored in a deduplicated state.

In some implementations, more than two values may be combined to produce a data chunk fingerprint. For instance, values may be concatenated, XOR'd, or combined in other ways to produce the fingerprint.

At 312, a determination is made as to whether the data stream includes additional data. According to various embodiments, the data stream may be parsed and fingerprinted on a rolling basis until the data stream is parsed and fingerprinted in its entirety.

In particular embodiments, the operations shown in FIG. 3 may be performed in an order different than that shown. For example, all or portions of a data stream may be parsed into a group of chunks prior to performing fingerprinting or constructing hash values for any of the chunks.

Figure 4:
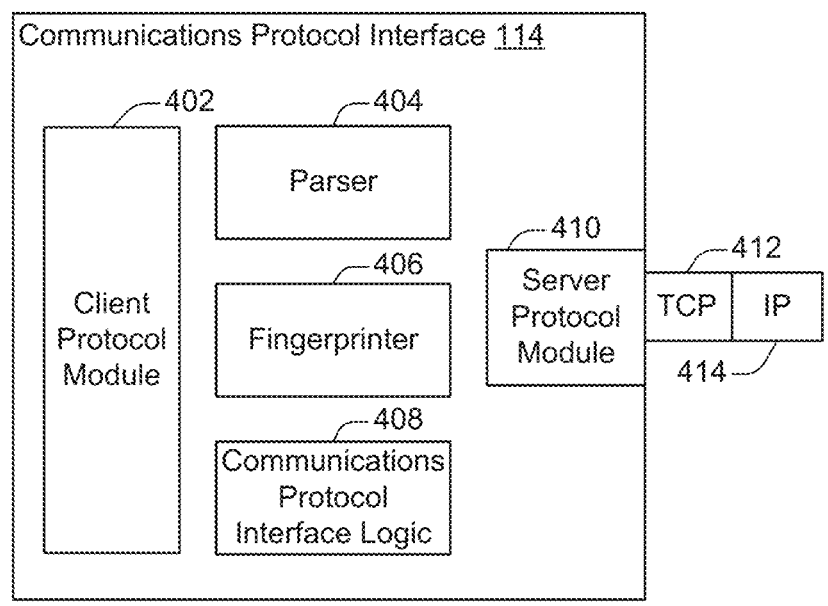
FIG. 4 illustrates an example of a communications protocol interface, configured in accordance with one or more embodiments.

FIG. 4 illustrates an example of a communications protocol interface 114, configured in accordance with one or more embodiments. The communications protocol interface 114 may be located at a client device and configured to facilitate potentially complex interactions between the client device and a remote server such as a networked storage system.

According to various embodiments, the communications protocol interface 114 includes a client protocol module 402, a parser 404, a fingerprinter 406, communications protocol interface logic 408, and a server protocol module 410. The communications protocol interface 114 may be communicably coupled with TCP/IP interfaces 412 and 414, which may facilitate communications with a remote server.

In particular embodiments, the communications protocol interface 114 may be configured to appear to other modules at the client device as a conventional communications protocol interface while at the same time performing unconventional tasks such as client-side deduplication. The communications protocol interface 114 may perform such tasks at least in part by incorporating one or more components similar to those more conventionally found in a remote server.

According to various embodiments, the communications protocol interface 114 may implement a parser and fingerprinter substantially similar to those present at a networked storage system. Applying the same parsing and fingerprinting techniques at communications protocol interface 114 located at the client device may allow for operations such as client-side deduplication. For instance, rather than blindly sending data from the client device to a networked storage system when that data may be a duplicate of data already stored at the networked storage system, the communications protocol interface may first parse and fingerprint the data. Then, the client device may communicate with the networked storage system to determine whether the data needs to be sent. If the data does not need to be sent, then bandwidth may be reduced. If the data does need to be sent, then the data may be stored directly in storage at the networked storage system without necessarily performing server-side deduplication of the data. In this way, bandwidth usage and/or server-side resources may be conserved.

According to various embodiments, the client protocol module may be configured to allow the communications protocol interface 114 to communicate with other modules at the client device via a standard communications protocol. For instance, a processor at the client device may communicate with the communications protocol interface 114 via a protocol such as CIFS, OST, or NFS. The client protocol module 402 may be configured to process communications sent and received in such formats.

According to various embodiments, the parser 404 may be configured to receive a stream of data and separate the data into chunks for storage at a networked storage system. The parser 404 may be configured in such a way that two data streams identical except for offset will be reliably parsed into the same chunks. Also, two similar and well-ordered data streams may be reliably parsed in a similar fashion. In this way, data streams may be parsed into chunks in a manner likely to frequently generate duplicate chunks when similar data is provided to the parser. Then, the system can identify overlapping data portions in two similar data streams and avoid storing duplicate data chunks.

In particular embodiments, the parser 404 is identical to a parser implemented at the networked storage system in communication with the client device. By implementing the same parser at the client device, data can be parsed in the same way at the two devices. For instance, if the same data stream were to be parsed at the client-side and server-side parsers, the chunks that resulted from the different parsing operations may be identical.

In some embodiments, the fingerprinter 406 may generate a fingerprint of a chunk for purposes such as identification and deduplication. A fingerprint may also be referred to as a hash value or a checksum. For instance, the fingerprinter 406 may compute a hash value as discussed with respect to the method 300 shown in FIG. 3.

In particular embodiments, the fingerprinter 406 is identical to a fingerprinter implemented at a networked storage system in communication with the client device. By implementing an identical fingerprinter at the client device, data can be fingerprinted in the same way at the two devices. For instance, if the same chunks were to be fingerprinted at the client-side and server-side fingerprinter, the fingerprints that resulted from the different fingerprinting operations may be identical.

In some embodiments, the communications protocol interface logic 408 may be configured with instructions to facilitate various interactions between the client and a server such as a networked storage system. For instance, the communications protocol interface logic 408 may be configured with computer programming language instructions that govern the operation of the other components of the communications protocol interface 114. In one example, the communications protocol interface logic 408 may be configured to facilitate client-side data deduplication, as is discussed with respect to FIGS. 7 and 8.

According to various embodiments, the server protocol module 410 may be operable to communicate with a remote server such as a networked storage system. For instance, the server protocol module 410 may be configured to communicate using a proprietary protocol. The server protocol module 410 may be operable to perform operations such as determining whether a chunk having a particular fingerprint is stored at the networked storage system. Alternately, or additionally, the server protocol module 410 may be operable to store information to and/or retrieve information from the networked storage system. For example, the server protocol module 410 may be equipped for direct memory access at the networked storage system.

Figure 5:
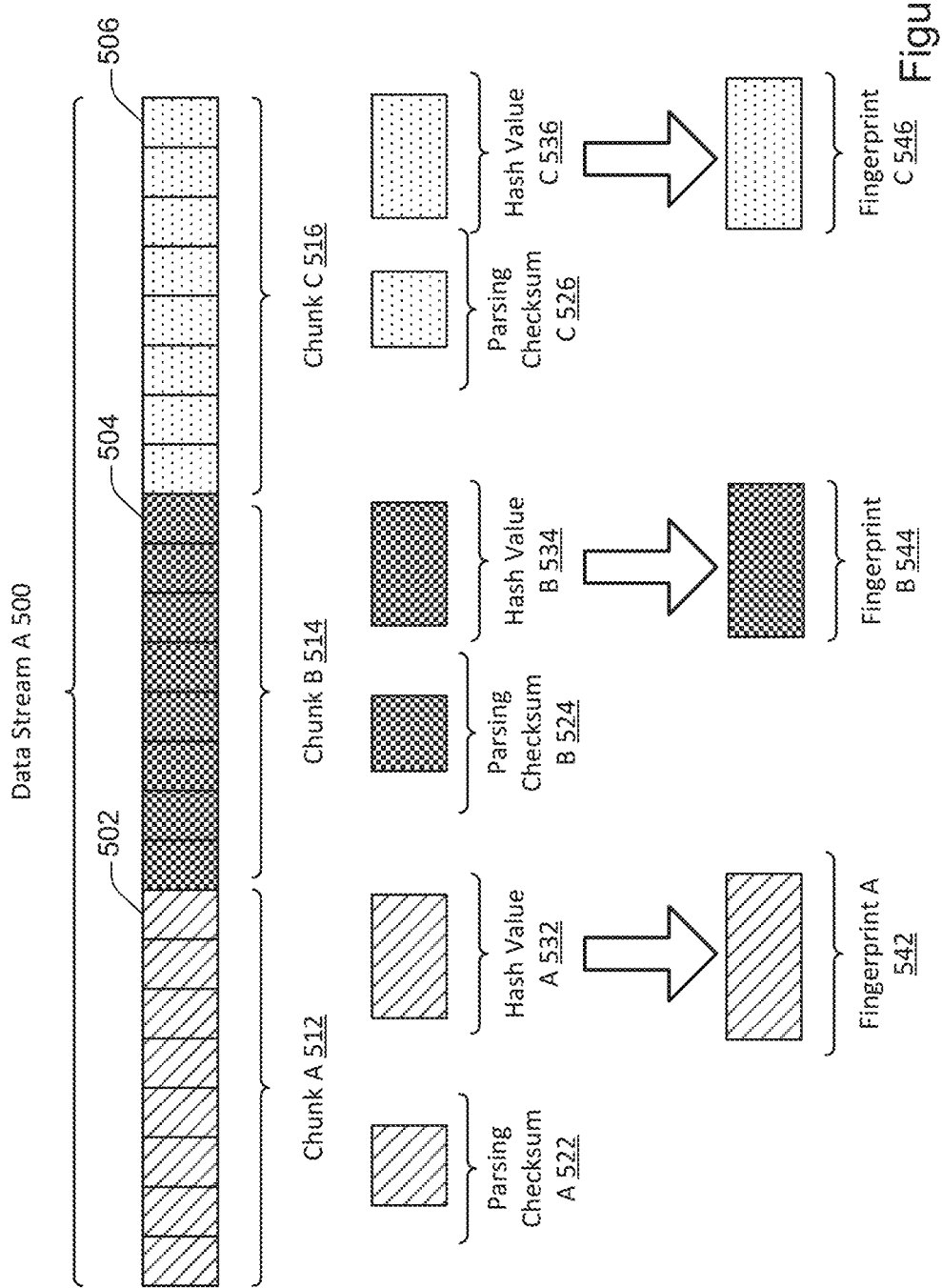
FIG. 5 illustrates a configuration of a data stream, presented in accordance with one or more embodiments.

FIG. 5 illustrates a configuration of data streams, presented in accordance with one or more embodiments. FIG. 5 includes data stream 500. The data stream is parsed into chunks 512, 514, and 516 by a parser. The data stream includes a plurality of data segments, including data segments 502-506. Each data segment may represent one or more bits, bytes, or any other unit of data size.

In some embodiments, a parser may parse a data stream into chunks. The parser may compute a rolling hash function to identify chunk barriers. For instance, the parser may compute a rolling hash that includes the data segment 502. When the hash is computed, it may be compared with one or more boundary condition criteria to determine whether the parsing of the data stream has reached a chunk boundary. For instance, a chunk boundary may be identified when a rolling hash value is a prime number, is divisible by a designated value, or has some other such mathematical property.

In the example shown in FIG. 5, the data segment 502 represents such a chunk boundary. Accordingly, the parser draws a boundary, and the data between the chunk boundary at the data segment 502 and the previous chunk boundary is designated as chunk A 512. The parser continues parsing the data stream 500 in this fashion, reaching a new boundary at the data segment 504 and designating the chunk B 754, and reaching another boundary at the data segment 506 and designating the chunk C 516.

According to various embodiments, the parsing of a data stream into chunks may produce a rolling checksum for each chunk. For instance, in FIG. 5, the parsing of the data stream 500 produces the parsing checksum A 522, the parsing checksum B 524, and the parsing checksum C 526. As discussed herein, a checksum produced during the parsing process may be stored and used for strengthening a fingerprint.

According to various embodiments, each chunk may be hashed to produce a hash value after the chunk is parsed. For instance, the chunks shown in the data stream 500 are hashed to produce the hash value A 532, the hash value B 534, and the hash value C 536. The hashes may be used to construct fingerprints to identify the chunks.

According to various embodiments, a fingerprint for a chunk may be produced by combining the hash value for a chunk with an intermediate hash value produced in the process of parsing or hashing the chunk. For instance, the chunks shown in FIG. 5 have been processed to produce the fingerprint A 542, the fingerprint B 544, and the fingerprint C 546, which correspond respectively with chunk A 512, chunk B 514, and chunk C 516.

According to various embodiments, one or more of various intermediate hash values may be used to produce a fingerprint. For example, a parsing checksum such as the parsing checksums 522-526 shown in FIG. 5 may be used as intermediate hash values. As another example, an intermediate value computed during the determination of the chunk hash value may be used as an intermediate hash value. Using an intermediate value computed during the determination of a chunk hash value is discussed in additional detail with respect to FIG. 6.

It should be noted that although the data stream 500 shown in FIG. 5 includes only three data chunks, data streams frequently include many data chunks. For instance, a data stream may include thousands or millions of data chunks.

Figure 6:
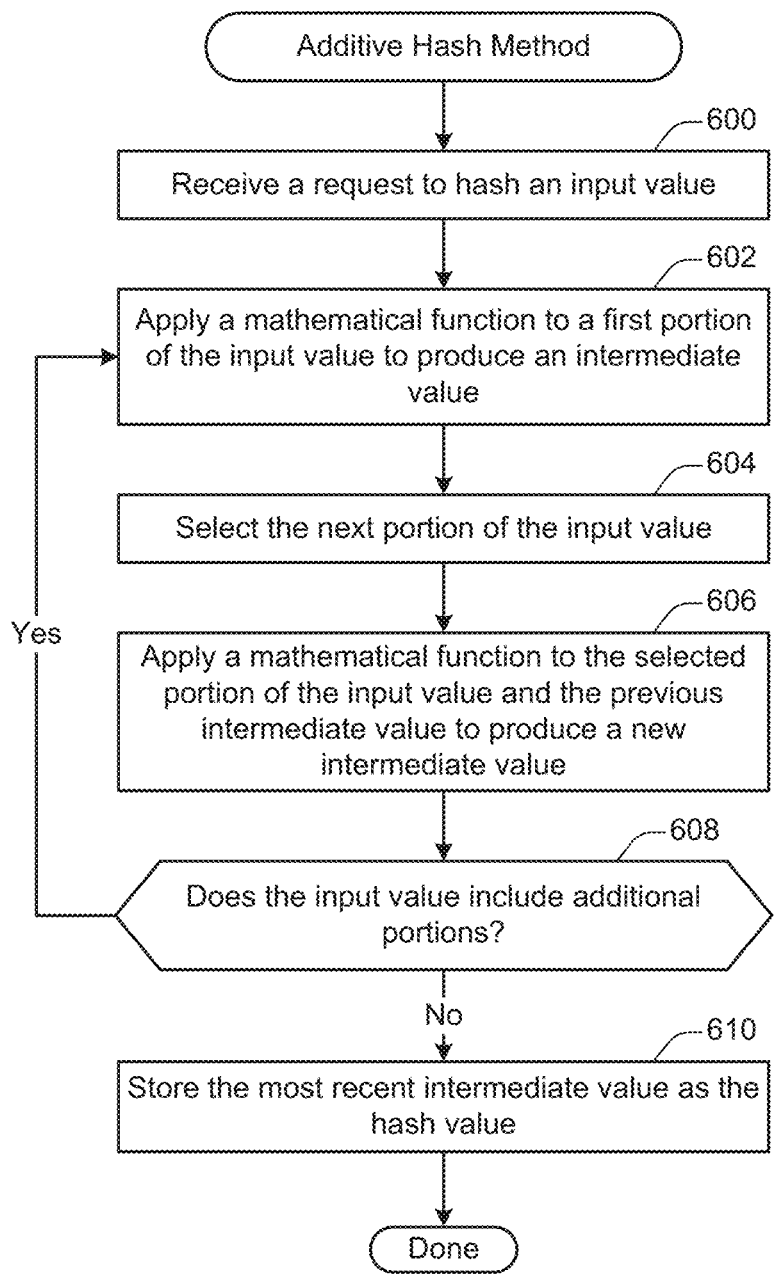
FIG. 6 illustrates an example of a hashing method, presented in accordance with one or more embodiments.

FIG. 6 illustrates an example of a method 600 for hashing a data chunk, performed in accordance with one or more embodiments. According to various embodiments, the method 600 may receive as input a data chunk and produce a hash value. The hash value may be used to construct a fingerprint for identifying the data chunk. In some implementations, an intermediate value produced during the determination of the data chunk may be used to strengthen the fingerprint.

At 602, a request is received to hash an input value. For instance, the input value may be a data chunk as described with respect to FIGS. 3, 5, and 7. The data chunk may be hashed as part of a procedure for transmitting a data stream to a networked storage system for storage in a deduplicated state.

At 604, a mathematical function is applied to a first portion of the input value to produce an intermediate result. For instance, instead of applying a hash algorithm to the entirety of the chunk to produce a final hash value as a fingerprint, instead the system may select one or more intermediate values at predetermined offsets while the calculation is underway and use those values to strengthen the final result. According to various embodiments, the mathematical function employed may depend on the type of hash function being used. For instance, a fast hashing function such as MD5 or SHA-1 may be used.

At 606, the next portion of the input value is selected. In some implementations, a hash value may be computed for a data chunk by selecting successive portions of the data chunk and applying a mathematical function to the successive portions.

At 608, a mathematical function is applied to a first portion of the input value and the previous intermediate result to produce the next intermediate result. According to various embodiments, the mathematical function employed may depend on the type of hash function being used. By applying the mathematical function using as input values both the previous intermediate result and a portion of the input value, the new intermediate value may depend on all of the previous portions of the input value without needing to apply the mathematical function to the entire input value at once. Alternatively, instead of or in addition to adding intermediate values, one or more intermediate values can be concatenated to form the final hash value. For example, in a chunk that computed 16 bytes of hash using MD5, if an intermediate value was picked at offset n/2, then the final hash could be 32 bytes (i.e. 16 bytes intermediate+16 bytes final).

According to various embodiments, operation 608 may involve operations such as storing an intermediate value for further use. For instance, an intermediate value may be stored for the purpose of strengthening a fingerprint.

At 610, a determination is made as to whether the input value includes additional portions. As discussed with respect to operation 608, the portions of the input value may be processed in succession. At 612, when all portions of the input value have been processed, the most recent intermediate value is stored as the hash value of the input value.

According to various embodiments, one or more intermediate values produced during the hashing of a data chunk may be used to strengthen a fingerprint, as discussed with respect to FIG. 3. For instance, an intermediate value used to strengthen the fingerprint may be any of the intermediate values discussed with respect to FIG. 3. The intermediate value to use may be specified by designating a set of agreed-upon offsets, which may be characterized as an index identifying a portion of the data chunk selected at operation 604. For instance, if a data chunk includes n portions, the intermediate values produced at offsets n/4, n/2, and/or 3n/4 may be selected for strengthening the fingerprint.

Figure 7:
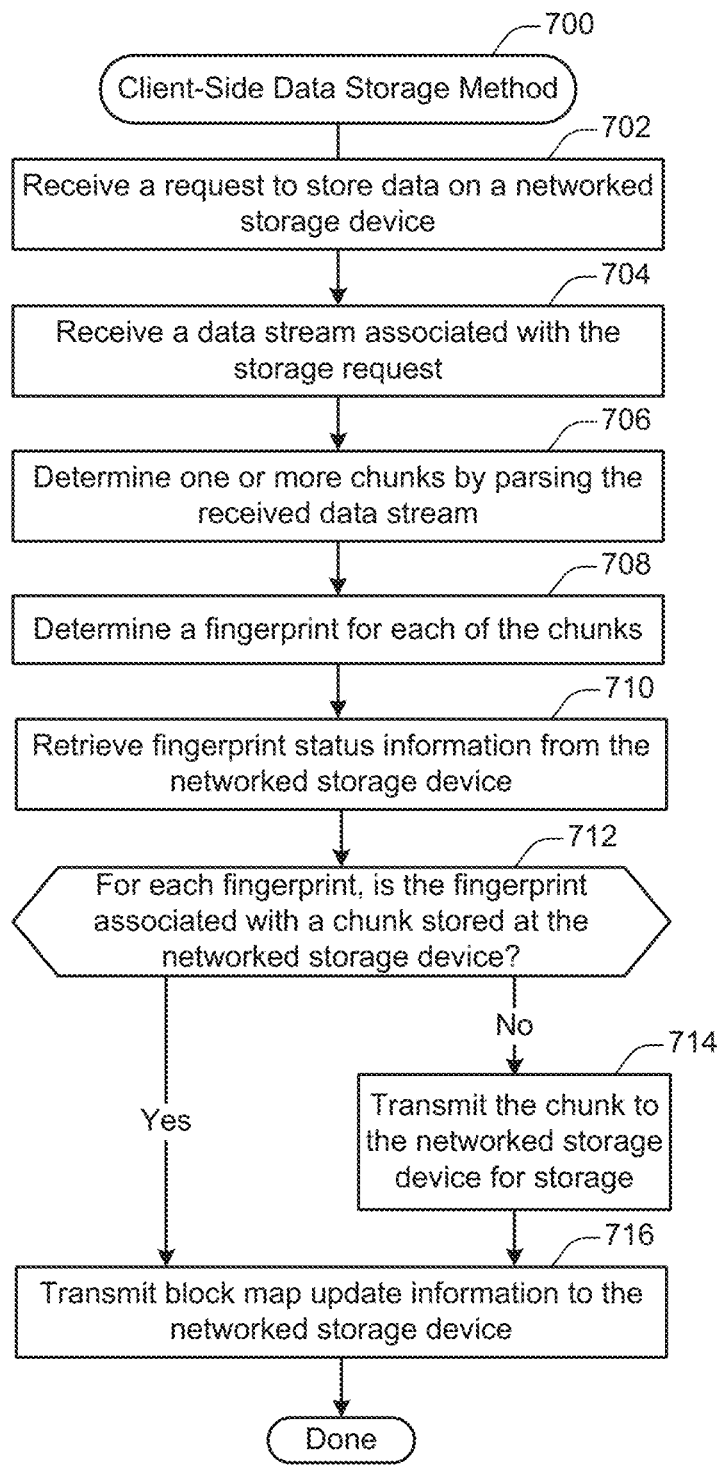
FIG. 7 illustrates an example of a client-side data storage method, performed in accordance with one or more embodiments.

FIG. 7 illustrates an example of a client-side data storage method 700, performed in accordance with one or more embodiments. The method 700 may be performed as part of a procedure in which data is transmitted from a client device to a networked storage system for storage. The method 700 may be performed on a client device, such as the client device 104 shown in FIG. 1.

In particular embodiments, the method 700 may be performed in association with a communications protocol interface configured to facilitate interactions between the client machine and the networked storage system. For instance, the method 700 may be performed in association with the communications protocol interface 114 shown in FIG. 1.

At 702, a request to store data on a networked storage system is received. In some embodiments, the request may be received as part of a backup operation. For instance, the client device may initiate the request in order to store backup data on the networked storage system. Alternately, or additionally, the request may be received as part of an operation to store data for retrieval by other devices via a network.

According to various embodiments, the request may be generated by a processor or other module on the client device. The request may be received at a communications protocol such as the interface 114 shown in FIG. 1. For instance, the request may conform to a communications protocol for transmitting information via a network, such as a CIFS, OST, or NFS protocol.

In some implementations, the request may identify various metadata associated with a storage operation. For instance, the request may include one or more headers that identify one or more file names, file sizes, directories, or other such data.

At 704, a data stream associated with the storage request is received. According to various embodiments, the data stream may include data designated for storage. For instance, the data stream may include the contents of one or more files identified in the request received at operation 702.

At 706, one or more chunks are determined by parsing the received data stream. According to various embodiments, the parser may be configured in such a way that two data streams identical except for offset will be reliably parsed into the same chunks. Also, two similar and well-ordered data streams may be reliably parsed in a similar fashion. In this way, data streams may be parsed into chunks in a manner likely to frequently generate duplicate chunks when similar data is provided to the parser.

At 708, a fingerprint is determined for each of the chunks. According to various embodiments, the fingerprint may be determined as discussed with respect to FIGS. 3-6.

At 710, fingerprint status information from the networked storage system is retrieved. In some embodiments, the fingerprint status information may be retrieved by transmitting the fingerprints determined at operation 708 to the networked storage system. The fingerprints may be substantially smaller than the chunks with which they are associated. Thus, transmitting the fingerprints to the networked storage system may require substantially less bandwidth than transmitting the entire chunks.

In particular embodiments, the fingerprints may be transmitted as part of a request to the networked storage system to determine whether chunks associated with the fingerprints are stored at the networked storage system. When the request is received, the networked storage system may provide a response that indicates which of the chunks are stored on the networked storage system and/or which of the chunks are not stored on the networked storage system.

At 712, a determination is made for each fingerprint as to whether the fingerprint is associated with a chunk stored at the networked storage system. According to various embodiments, the determination may be made by processing one or more messages received from the networked storage system as part of the operation 710.

At 714, the chunk is transmitted to the networked storage system if it is determined that chunk fingerprint is associated with a chunk stored at the network storage device. According to various embodiments, the chunk may be stored at the networked storage system in a data store managed by the data store system.

At 716, block map update information is transmitted to the networked storage system. The block map may be used to track blocks stored at the networked storage system. According to various embodiments, the block map update information may be used for updating a block map at the networked storage system. The contents of the block map update information may vary based at least in part on the determination made at operation 710.

For example, if it is determined that the chunk is already stored on the networked storage system, then the block map update information may include new block map and/or MDS entries that point to the existing chunk. In this way, references to the existing chunk are maintained and the chunk is not unlinked (i.e. deleted) even if other references to the chunk are removed.

As another example, if instead it is determined that the chunk is not already stored on the networked storage system, then the block map update information may include new block map and/or MDS entries that point to the storage location of the new chunk transmitted at operation 714. For instance, the block map entry may include a data store ID associated with the storage location of the new chunk.

Figure 8:
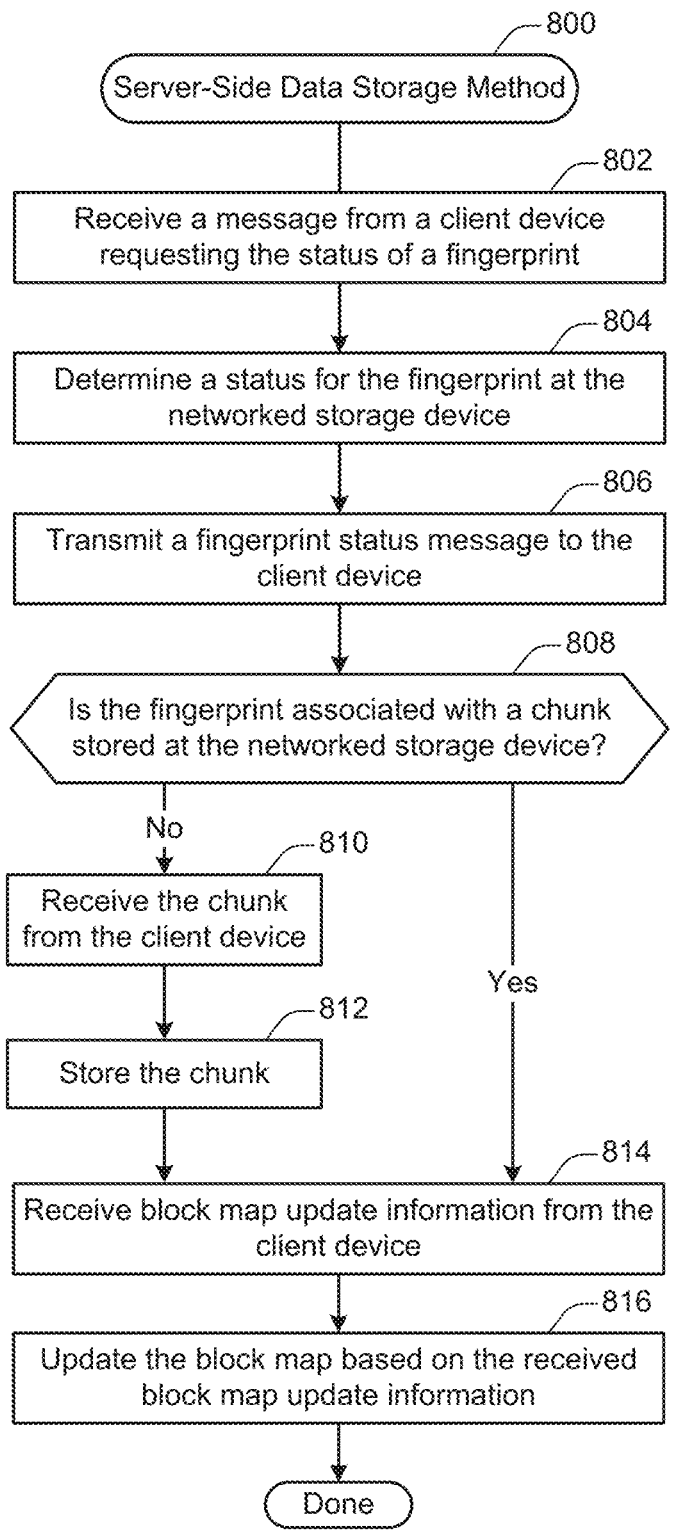
FIG. 8 illustrates a server-side data storage method, performed in accordance with one or more embodiments.

FIG. 8 illustrates a server-side data storage method 800, performed in accordance with one or more embodiments.

The method 800 may be performed at a networked storage system such as the system 102 shown in FIG. 1. The method 800 may be performed in conjunction with the method 700 discussed with respect to FIG. 5. For instance, the method 800 may be performed to facilitate the storage of data at a networked storage system, where the data is deduplicated at a client device from which the data originates.

At 802, a message requesting the status of a fingerprint is received at the networked storage system. According to various embodiments, the request message received at operation 802 may include one or more fingerprints that are each associated with a data chunk. The message may be received from a client device in communication with the networked storage system via a network. For instance, the message may be transmitted as part of the information retrieval operation 710 discussed with respect to FIG. 7.

At 804, a determination is made as to the status for the fingerprint identified by the request message received at operation 802. According to various embodiments, determining the status of the fingerprint may involve evaluating whether a chunk corresponding with the fingerprint is stored at the networked storage system. The networked storage system may make this determination by comparing the fingerprint to entries in the block map at the networked storage system.

At 806, a fingerprint status message is transmitted to the client device. According to various embodiments, the fingerprint status message may indicate whether a chunk associated with the fingerprint is stored at the networked storage system. For instance, the fingerprint status message may indicate the results of the determination made at operation 804.

At 808, a determination is made as to whether the fingerprint is associated with a chunk stored at the networked storage system. According to various embodiments, the determination may be made based on the status information determined at operation 804.

At 810, if the chunk is not stored at the networked storage system, the chunk may be received from the networked storage system. At 812, the chunk is stored. In particular embodiments, the chunk may be transmitted as discussed with respect to operation 712 shown in FIG. 5.

At 814, block map update information is received from the client device. According to various embodiments, the block map update information may be generated as discussed with respect to operation 714 shown in FIG. 7. For example, if it is determined that the chunk is already stored on the networked storage system, then the block map update information may include new block map and/or MDS entries that point to the existing chunk. In this way, references to the existing chunk are maintained and the chunk is not unlinked (i.e. deleted) even if other references to the chunk are removed. As another example, if instead it is determined that the chunk is not already stored on the networked storage system, then the block map update information may include new block map and/or MDS entries that point to the storage location of the new chunk stored at operation 812. For instance, the block map entry may include a data store ID associated with the storage location of the new chunk.

At 816, the block map is updated based on the received block map update information. According to various embodiments, updating the block map may involve entering the changes identified in operation 814 in the block map that tracks blocks stored at the networked storage system.

Because various information and program instructions may be employed to implement the systems/methods described herein, the present invention relates to non-transitory machine-readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher-level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A computing device comprising:
memory configured to store a data stream, the data stream being parsed into a plurality of data chunks;
a processor configured to:
determine a first data chunk hash value for a first portion of each of the plurality of data chunks by applying a hash function to the first portion of each of the plurality of data chunks;
generate a first data chunk fingerprint based on the first data chunk hash value and one or more respective intermediate hash values by applying a mathematical function to the first data chunk hash value and the one or more respective intermediate hash values;
determine a second data chunk hash value for a successive portion of each of the plurality of data chunks by applying the hash function to the successive portion of each of the plurality of data chunk; and
generate a new respective intermediate hash value by applying the mathematical function to the second data chunk hash value and a previous intermediate hash value, the new respective intermediate hash value dependent upon the first portion and the second portion;
and
a communications interface configured to transmit the respective data chunk fingerprint to a remote server for each of the plurality of data chunks, each data chunk fingerprint including the respective data chunk hash value and the new respective intermediate hash values.

2. The computing device recited in claim 1, wherein the one or more respective intermediate hash values are generated during the parsing of the data stream or during the determining of the data chunk hash values.

3. The computing device recited in claim 1, wherein a first data chunk checksum value is generated during the parsing of the data stream.

4. The computing device recited in claim 3, wherein the one or more respective intermediate hash values includes the first data chunk checksum value.

5. The computing device recited in claim 1, wherein the hash function is an additive hash function which yields the data chunk hash value by summing a plurality of results produced by applying the mathematical function to a respective data chunk and a plurality of intermediate results.

6. The computing device recited in claim 5, wherein the one or more respective intermediate hash values includes one or more of the intermediate results.

7. The computing device recited in claim 1, wherein the first data chunk fingerprint is determined by concatenating the respective data chunk hash value and the new respective intermediate hash value.

8. The computing device recited in claim 1, wherein the communications interface is further configured to receive a data chunk status message, the data chunk status message indicating whether a data chunk associated with one of the data chunk fingerprints is stored at the remote server.

9. The computing device recited in claim 8, wherein the communications interface is further configured to transmit the data chunk to the remote server for storage when it is determined that the data chunk is not stored at the remote server.

10. A method, comprising:
parsing a data stream into a plurality of data chunks, the data stream being stored in memory;
generating one or more respective intermediate hash values during the parsing of the data stream;
via a processor, determining a first data chunk hash value for a first portion of each of the plurality of data chunks by applying a hash function to the first portion of each of the plurality of data chunks; generating a first data chunk fingerprint based on the first data chunk hash value and the one or more respective intermediate hash values by applying a mathematical function to the first data chunk hash value and the one or more respective intermediate hash values; determining a second data chunk hash value for a successive portion of each of the plurality of data chunks by applying the hash function to the successive portion of each of the plurality of data chunk; and generating a new respective intermediate hash value by applying the mathematical function to the second data chunk hash value and a previous intermediate hash value, the new respective intermediate hash value dependent upon the first portion and the second portion; and
via a communications interface, transmitting the respective data chunk fingerprint to a remote server for each of the plurality of data chunks, each data chunk fingerprint including the respective data chunk hash value and the new respective intermediate hash values.

11. The method recited in claim 10, wherein the one or more respective intermediate hash values are generated during the parsing of the data stream or during the determining of the data chunk hash values.

12. The method recited in claim 10, wherein a first data chunk checksum value is generated during the parsing of the data stream.

13. The method recited in claim 12, wherein the one or more respective intermediate hash values includes the first data chunk checksum value.

14. The method recited in claim 10, wherein the hash function is an additive hash function which yields the data chunk hash value by summing a plurality of results produced by applying the mathematical function to a respective data chunk and a plurality of intermediate results, and wherein the one or more respective intermediate hash values includes one or more of the intermediate results.

15. The method recited in claim 10, wherein the first data chunk fingerprint is determined by concatenating the respective data chunk hash value and the new respective intermediate hash value.

16. The method recited in claim 10, wherein the communications interface is further configured to receive a data chunk status message, the data chunk status message indicating whether a data chunk associated with one of the data chunk fingerprints is stored at the remote server.

17. One or more non-transitory computer readable media having instructions stored thereon for causing a system to perform operations comprising:
- parsing a data stream into a plurality of data chunks, the data stream being stored in memory;
- generating one or more respective intermediate hash values during the parsing of the data stream;
- via a processor, determining a first data chunk hash value for a first portion of each of the plurality of data chunks by applying a hash function to the first portion of each of the plurality of data chunks; generating a first data chunk fingerprint based on the first data chunk hash value and the one or more respective intermediate hash values by applying a mathematical function to the first data chunk hash value and the one or more respective intermediate hash values; determining a second data chunk hash value for a successive portion of each of the plurality of data chunks by applying the hash function to the successive portion of each of the plurality of data chunk; and generating a new respective intermediate hash value by applying the mathematical function to the second data chunk hash value and a previous intermediate hash value, the new respective intermediate hash value dependent upon the first portion and the second portion; and
- via a communications interface, transmitting a respective data chunk fingerprint to a remote server for each of the plurality of data chunks, each data chunk fingerprint including the respective data chunk hash value and the one or more respective intermediate hash values.

18. The one or more non-transitory computer readable media recited in claim 17, wherein the one or more respective intermediate hash values are generated during the parsing of the data stream or during the determining of the data chunk hash values.

* * * * *